United States Patent [19]

Laten et al.

[11] Patent Number: 4,573,647

[45] Date of Patent: Mar. 4, 1986

[54] FIBER DEPLOYMENT MECHANISM

[75] Inventors: Bobby W. Laten, Hazel Green; Johnny L. Prater, Huntsville, both of Ala.

[73] Assignee: The United States of America as represented by the Secretary of the Army, Washington, D.C.

[21] Appl. No.: 615,428

[22] Filed: May 30, 1984

[51] Int. Cl.⁴ .............................................. F41G 7/32
[52] U.S. Cl. .................................................. 244/3.12
[58] Field of Search ....................................... 244/3.12

[56] References Cited

U.S. PATENT DOCUMENTS

| 3,156,185 | 11/1964 | Hermann et al. | 244/3.12 |
| 3,233,548 | 2/1966 | Chilowsky | 244/3.12 |
| 3,266,423 | 8/1966 | Simpson | 244/3.12 |
| 3,319,781 | 5/1967 | Simpson et al. | 244/3.12 |
| 4,185,796 | 1/1980 | Riley | 244/3.12 |

Primary Examiner—Charles T. Jordan
Attorney, Agent, or Firm—Anthony Thomas Lane; Robert P. Gibson; James T. Deaton

[57] ABSTRACT

A fiber deployment mechanism for deploying a fiber at the launching of a missile to allow the fiber to be deployed without having to take the load as the missile is deployed and before the fiber is actually being paid-out from its bobbin.

6 Claims, 2 Drawing Figures

FIBER DEPLOYMENT MECHANISM

DEDICATORY CLAUSE

The invention described herein may be manufactured, used, and licensed by or for the Government for governmental purposes without the payment to us of any royalties thereon.

BACKGROUND OF THE INVENTION

In the past, deploying a fiber from the side of a missile during launch applied a direct pull to the fiber. The fiber then pulled tearing through a cover on the side of the missile as the missile moved forward. The fiber had to be strong enough to withstand resultant loads and this was not desirable or good.

Therefore, it is an object of this invention to eliminate direct pull on the fiber during deployment and thereby greatly reduce stress imparted to the fiber.

Another object of this invention is to employ a stronger fiber or band of fibers or other material that can be used to tear through a covering that can be used to hold the fiber in place until deployment.

Still another object of this invention is to use a deployment arrangement that is especially adapted for deploying an optical fiber.

Other objects and advantages of this invention will be obvious to those skilled in this art.

SUMMARY OF THE INVENTION

In accordance with this invention, a fiber deployment mechanism is provided on the side of the missile and mounts the fiber in a particular position from the bobbin on the missile to the launcher from which the missile is to be launched. This fiber deployment mechanism includes a cover of a material that can be easily torn with the cover being secured in a spaced position by spacers at the edge of the cover. Between an under surface of the cover and the outer surface of the missile, a tape, group of fibers or other substantial structure is secured to the under side of the cover with the fiber positioned under the tape and at the surface of the missile. The tape is also secured to the fixed launcher with the fiber including a loose loop at the inner connection of the fiber to the launcher and down the deployment mechanism to the spool on the missile. This mounting allows the tape to tear the cover and allows the fiber to be deployed through the torn portion of the cover as the missile is launched. By this mounting, the tape absorbs the load imparted by launching as the cover is torn away and as the missile moves forward the tape completely parts the cover and frees the fiber to pay out from its bobbin.

DESCRIPTION OF THE PREFERRED EMBODIMENT

Figure 1:
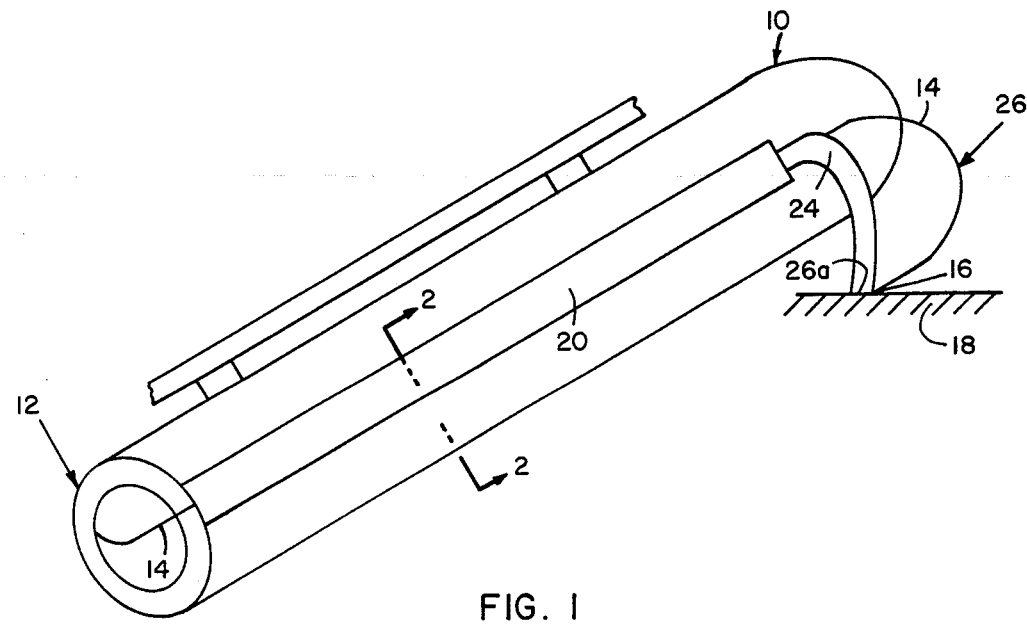
FIG. 1 is a schematic and pictural view of the missile with the fiber deployment mechanism mounted on the side of the missile and innerconnected to a fixed launcher means.
Figure 2:
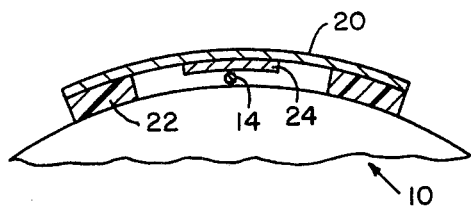
FIG. 2 is an enlarged sectional view along line 2—2 of FIG. 1 with portions of the missile cutaway.

Referring now to the drawing, a missile 10 has a bobbin 12 mounted thereon in a conventional manner for dispensing a fiber 14 wound on bobbin 12. Fiber 14 can be an optical fiber or a wire fiber and fiber 14 has one end secured at 16 to a fixed structure such as the launcher for the missile and fiber 14 serves as the data link between missile 10 and the ground station at launcher 18. Fiber 14 is held in place prior to launch and during launch by a cover 20 that is made of paper or other material that will tear relatively easily and cover 20 is secured to missile 10 through spacers 22. Cover 20 is secured to the missile in a conventional manner such as by bonding, screws, or other mechanical fastener for securing devices of this nature. A tear strip 24 is secured, such as by bonding, to the under surface of cover 20 and is made of a material that is stronger than cover 20 and mounted to the under surface of cover 20 with fiber 14 on an opposite side of tear strip 24. Tear strip 24 holds fiber 14 between its under surface and the outer surface of missile 10 until the missile is being deployed. Tear strip 24 can be made of most any material that is stronger than cover 20 and can be fiber material, a group of fibers, tape or any other material which can tear cover 20 over its full length as missile 10 is being launched. Tear strip 24 is secured to launcher 18 as illustrated at end 260 to form a tighter connection of tear strip 24 relative to the launcher then the innerconnection of fiber 14 to launcher 18. That is, loop 26 of fiber 14 is provided so that no appreciable load or stress forces will be initially applied to fiber 14 during launch until missile 10 is moving away from the launcher and fiber 14 can be easily dispensed or paid-out from bobbin 12 without imparting undue stress and loads to fiber 14. Fiber 14 is held in position along the length of missile 10 by cover 20 and tear strip 24 with the end of the fiber at 16 attached to the launcher and connected to the ground support equipment (not shown). The other end of fiber 14 is wound on bobbin 12 in a conventional manner and with the ultimate end of fiber 14 attached to the missile guidance and control electronics for guiding and controlling the missile.

In operation, with the missile and launcher positioned generally as illustrated and with fiber 14 and tear strip and cover 20 secured in place as illustrated, as missile 10 moves forward in relation to launcher 18, tear strip 24 tightens and then tears through cover 20. When missile 10 moves forward a sufficient distance, tear strip 24 completely parts cover 20 and frees fiber 14 without appreciable load being applied thereto and fiber 14 is paid-out from bobbin 12 in a free and conventional manner. By the arrangement specifically provided, fiber 14 does not have to be capable of withstanding loads and stresses as have been required of fibers utilized in fiber systems of this type in the past.

We claim:

1. A fiber deployment mechanism comprising a missile having a bobbin with fiber wound thereon, a fixed support mechanism mounted relative to said missile, said fiber being connected in a fixed relationship to said fixed support mechanism, and a deployment mechanism mounted linearly of an outer surface of said missile and also connected to said fixed support mechanism and serving to mount said fiber along said outer surface and for deployment by said deployment mechanism as said missile is launched away from said fixed support mechanism and preventing said fiber from having to bear undue load during launch and at the same time freeing said fiber for pay-out from said bobbin as said missile is launched.

2. A fiber deployment mechanism as set forth in claim 1, wherein said deployment mechanism includes a cover made of a material that is tearable and secured to the surface of said missile, and a tear strip mounted beneath said cover with said fiber being positioned between said tear strip and the surface of said missile, said tear strip also being secured to said fixed support so as to leave a loop in said fiber so as to cause the tear strip to take the load as the cover is torn and parted.

3. A fiber deployment mechanism as set forth in claim 2, wherein said fiber is an optical fiber.

4. A fiber deployment mechanism as set forth in claim 1, wherein said deployment mechanism includes a cover that is made of paper and a tear strip that is secured to said cover and said tear strip being made of a material that is more substantial than said cover so as to always tear said cover.

5. A fiber deployment mechanism as set forth in claim 4, wherein said fiber is an optical fiber.

6. A fiber deployment mechanism as set forth in claim 1, wherein said fiber is an optical fiber.

* * * * *